US008335791B1

(12) United States Patent
Goldstein et al.

(10) Patent No.: US 8,335,791 B1
(45) Date of Patent: Dec. 18, 2012

(54) DETECTING SYNONYMS AND MERGING SYNONYMS INTO SEARCH INDEXES

(75) Inventors: Michel L. Goldstein, Bellevue, WA (US); Walter Manching Tseng, Seattle, WA (US); Randall Winston Puttick, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 84 days.

(21) Appl. No.: 11/617,131

(22) Filed: Dec. 28, 2006

(51) Int. Cl.
*G06F 7/00* (2006.01)
*G06F 17/30* (2006.01)
(52) U.S. Cl. .......................... 707/739; 707/741; 707/749
(58) Field of Classification Search .................. 707/739, 707/741, 749
See application file for complete search history.

(56) References Cited

U.S. PATENT DOCUMENTS

| | | | |
|---|---|---|---|
| 5,675,819 A * | 10/1997 | Schuetze | 704/10 |
| 5,913,210 A * | 6/1999 | Call | 1/1 |
| 6,006,225 A | 12/1999 | Bowman et al. | |
| 6,366,910 B1 | 4/2002 | Rajaraman et al. | |
| 7,024,416 B1 * | 4/2006 | Ponte | 707/101 |
| 7,082,426 B2 | 7/2006 | Musgrove et al. | |
| 7,113,943 B2 * | 9/2006 | Bradford et al. | 707/4 |
| 7,343,551 B1 * | 3/2008 | Bourdev | 715/224 |
| 2006/0241901 A1 * | 10/2006 | Hanus et al. | 702/179 |

OTHER PUBLICATIONS

Gauch, Susan; Wang, Jianying; Rachakonda, Satya Mahesh, A corpus approach for automatic query expansion and its extension to multiple databases, Jul. 1999, Association for Computing Machinery, Inc., ACM transactions on Information Systems, v17, n3, p. 250-269.*
Feldman, "The Answer Machine", Searcher: The Magazine for Database Professionals, Jan. 2000, vol. 8, No. 1, p. 58.

* cited by examiner

*Primary Examiner* — Mariela Reyes
(74) *Attorney, Agent, or Firm* — Lee & Hayes, PLLC

(57) ABSTRACT

Tools and techniques are described herein for detecting synonyms and merging synonyms into search indexes. The tools provide methods that include receiving input documents for indexing into a search index file. The tools may compare parts of the input documents to parts of other documents already indexed into the search index file. The methods may also evaluate, based on these comparisons, whether the input document and the existing document are sufficiently similar to justify an inference that any dissimilar terms between the input document and the existing document are candidate synonyms. Other methods may include receiving requests to perform searches that include one or more input keywords. The method then searches for links to synonyms of the input keyword, and returns search results responsive to the input keyword and to the synonyms.

47 Claims, 13 Drawing Sheets

DETECTING SYNONYMS AND MERGING SYNONYMS INTO SEARCH INDEXES

BACKGROUND

As document content becomes increasingly available over wide area networks such as the Internet, indexing and categorizing this content for efficient search becomes more of a challenge for organizations that post content on, for example, web pages. This challenge is likely to become more of an issue as more organizations make information available via electronically searchable databases.

Another challenge with enabling users to electronically search for content is supporting searches for synonyms. Under some approaches, a search engine might receive a given input keyword search, and expand the keywords by identifying synonyms for the keywords at the time that the search is requested. Afterwards, the search engine may perform individual keyword searches for each identified synonym.

While the foregoing approaches may work suitably in some circumstances, there are nevertheless opportunities for improvement, as described further in this application.

SUMMARY

Methods, systems, and computer-readable media (collectively, "tools" and/or "techniques") are described herein for detecting synonyms and merging synonyms to search indexes. The tools provide methods that include receiving input documents for indexing into a search index file. The methods may compare parts of the input documents to parts of other documents already indexed into the search index file. The methods may also evaluate, based on these comparisons, whether the input document and the existing document are sufficiently similar to justify an inference that any dissimilar content in the input document as compared to the existing document are candidate synonyms. Other methods may include receiving requests to perform searches that include one or more input keywords. The method then searches for links to synonyms of the input keyword, and returns search results responsive to the input keyword and to the synonyms.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed to tools and techniques related to detecting synonyms and merging synonyms into search indexes. The description of these tools and techniques begins with an overview of illustrative operating environments for detecting synonyms and merging synonyms into search indexes, presented with FIG. 1.

Figure 1:
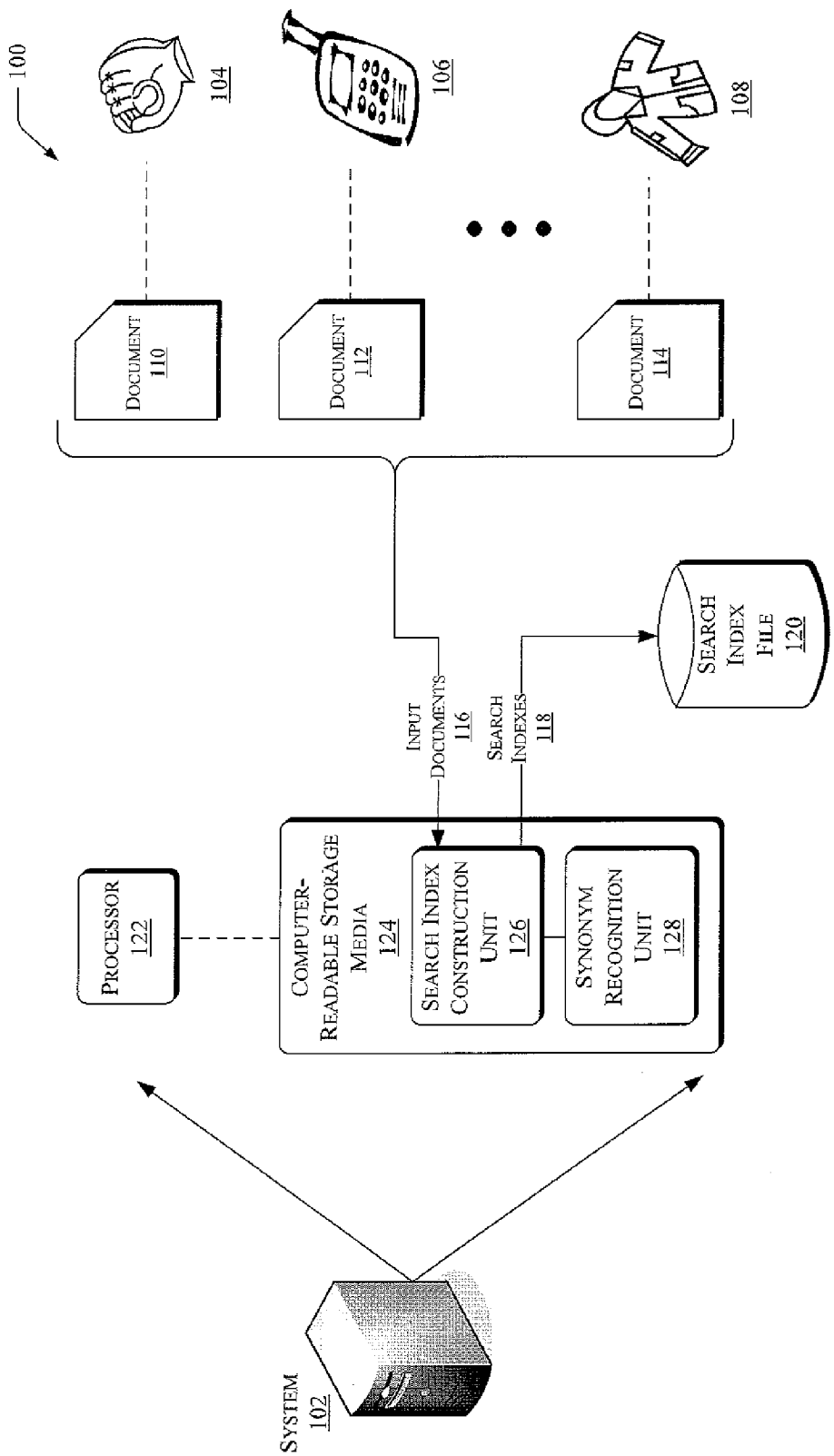
FIG. 1 is a block diagram of components and data flows relating to illustrative operating environments for detecting synonyms and merging synonyms into search indexes.

FIG. 1 illustrates components and data flows relating to illustrative operating environments 100 for detecting synonyms and merging synonyms into search indexes. The operating environments may include a system 102 that includes one or more servers or other suitable computer-based processing systems, as shown in FIG. 1. For ease of reference and discussion, but not limitation, this description refers to the system and the server 102 interchangeably.

The operating environments 100 may provide at least the server 102 as part of infrastructure that supports one or more resources or sites that are accessible over a network, for example, websites. In some implementations, the website may be a merchant website that offers goods and/or services (collectively and interchangeably referred to as "items") to customers. FIG. 1 shows examples of such goods at 104, 106, and 108. The goods may be organized into categories such as, without limitation, sporting goods (e.g., including baseball glove 104), electronics (e.g., including wireless device 106), apparel (e.g., including outerwear 108), or the like.

The various goods or services offered by the website may be associated with respective documents. These documents may contain descriptive content that facilities posting information about the documents or items accessible through the website. For example, FIG. 1 shows a document 110 that provides information about the baseball glove 104, a document 112 that provides information about the wireless device 106, and a document 114 that provides information about the outerwear 108. In some instances, but not necessarily all instances, manufacturers of the goods 104-108 may provide these documents 110-114.

It is also noted that the documents and goods shown in FIG. 1 are chosen only for ease of description and illustration, but not for limitation. More specifically, the operating environments described herein may process any number of documents, which may or may not be associated with the goods or services. For example, in some instances, the documents 110-114 may represent individual web pages on a non-merchant site.

These documents may be provided to the website or to the server 120 on an ongoing basis, as new products are made available through the website. FIG. 1 represents these input documents generally at 116, and for convenience only, the documents 116 are shown as input to the server 102. As detailed further below, the server 102 processes these documents, and indexes them for search. As part of this indexing process, the server may generate search indexes or indices, denoted generally at 118, based on these input documents 116. Search indexes for the documents may be collected and stored in a search index file 120.

Turning to the server 102 in more detail, the server may include one or more processors 122 that communicate with one or more instances of computer-readable storage media 124. The processors may read data from or write data to portions of the computer-readable storage media in performing any of the functions described herein. Additionally, the computer-readable storage media may contain software instructions that, when loaded into the processors, cause the server to perform any of the functions described herein.

The storage media 124 may contain one or more software modules that define a search index construction unit 126, which represents a software-based implementation of suitable instructions for processing the documents 110-114 and generating search indexes therefrom. The storage media 124 may also contain one or more software modules that define a synonym recognition unit 128, which represents a software-based implementation of suitable instructions for recognizing synonyms appearing within the documents, and incorporating those recognized synonyms into the search indexes.

In illustrating the storage media 124, FIG. 1 does not exclude hardware or firmware implementations of the search index construction unit 126 and the synonym recognition unit 128. Instead, FIG. 1 provides possible software-based implementations. However, some or all of the search index construction unit 126 and the synonym recognition unit 128 may be implemented with suitable electrical or electronic circuits. Additionally, the search index construction unit 126 and the synonym recognition unit 128 may reside on separate media or circuits.

Figure 2:
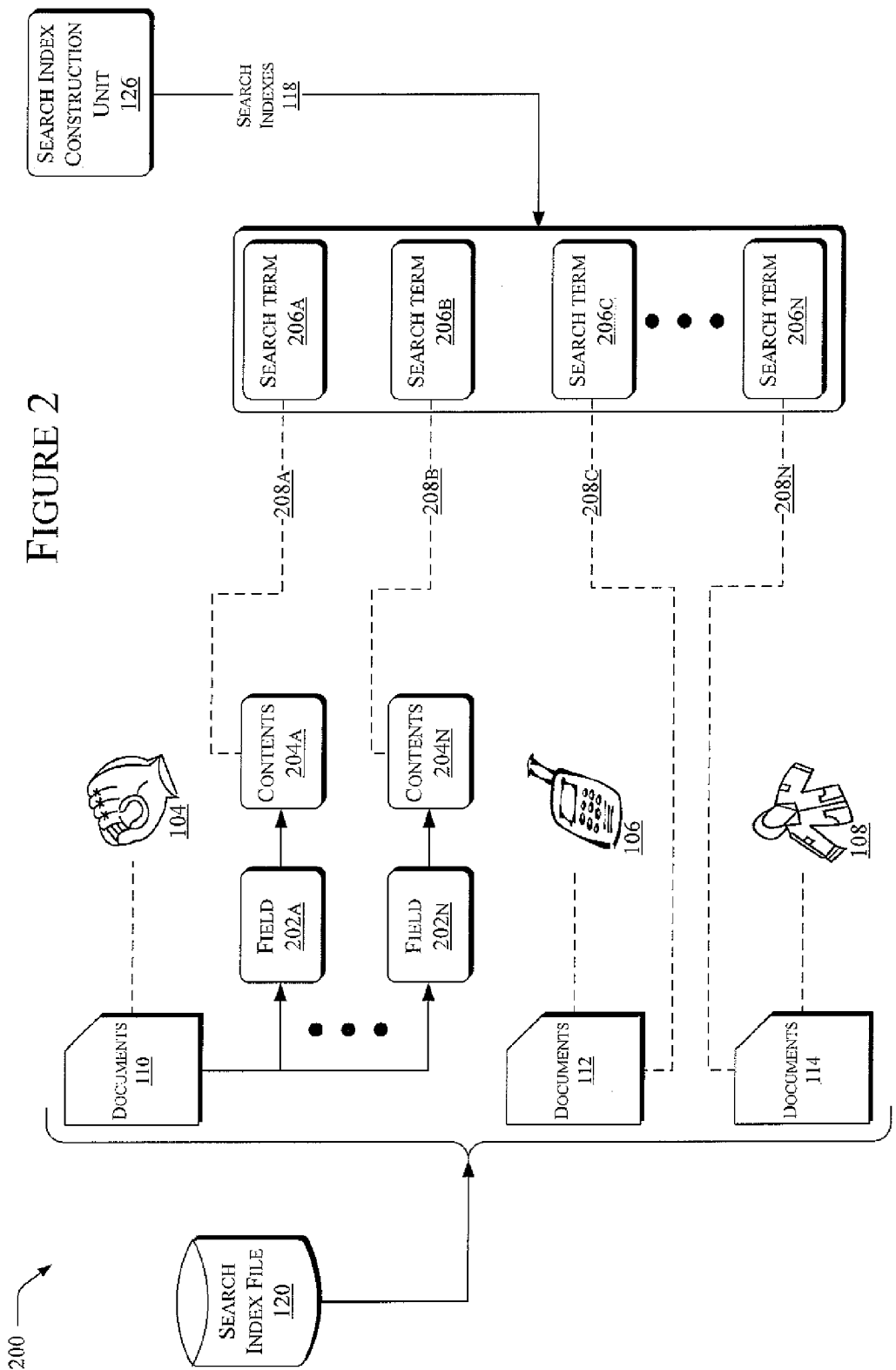
FIG. 2 is a block diagram of data structures suitable for implementing a search index file, such as the search index file shown in FIG. 1.

Having described the operating environments 100 in FIG. 1, the discussion now proceeds to a description of more detail related to the search index file 120, now presented with FIG. 2.

FIG. 2 illustrates data structures 200 suitable for implementing a search index file, such as the search index file shown in FIG. 1 at 120. For convenience and conciseness of description, but not to limit possible implementations, certain items described previously are carried forward into FIG. 2, and denoted by the same reference numbers.

The search index file may enable searches conducted across a plurality of documents, such as the documents 110-114. These documents may be represented in the search index file by respective data structures, denoted generally by the graphic elements for the documents 110-114 as shown in FIG. 2. In example implementations involving merchant websites, the various items accessible through the website may be associated with a respective descriptive document. In turn, the descriptive documents may be represented with suitable data structures.

While FIGS. 1 and 2 show one instance of the documents 110, 112, and 114 for conciseness of illustration, it is understood that implementations of the description herein could include any number of documents 110, 112, and 114. Thus, the description herein refers to these documents in plural number, without limiting these possible implementations.

As shown in FIG. 2, sporting goods items, such as the baseball glove 104, are associated with respective data structures for the documents 110. Likewise, electronics, such as the wireless device 106, are associated with respective data structures for the documents 112. Finally, in the example shown in FIG. 2, apparel, such as the outerwear 108, are associated with respective data structures for the documents 114.

Turning to the data structures for the documents in more detail, FIG. 2 shows illustrative fields and contents for a data structure corresponding to the document 110. Recalling that the document 110 relates to, for example, the baseball glove 104, the data structure may include one or more fields 202. For convenience only, FIG. 2 shows two fields 202A and 202N, but implementations of the data structures could contain any number of fields.

The fields may be populated by a manufacturer of the goods or services represented by the document 110, or by other parties or processes as appropriate in different implementations. In the baseball glove example, information in the different fields 202 may convey the size of the glove, the color of the glove, the material from which the glove is manufactured, the type of the glove (fielder, catcher, or the like), manufacturer name or identifier, a brand name, SKU or UPC codes, or other parameters of interest. Additionally, a field 202 may provide a textual description or title of the goods or services represented by the document 110.

As will be understood, these examples of different fields are given only for ease of discussion, but not to limit implementations of the description herein. Other fields may be included without departing from the spirit and scope of the description.

The fields 202 may contain data or other information, denoted generally in FIG. 2 as field contents 204. For convenience only, FIG. 2 shows two instances of field contents 204a and 204n, but implementations of the data structures could contain any number of field contents.

Continuing with the example of the baseball glove above, contents of "color" fields may include the text "brown," "dark beige," "black," or the like. Contents of SKU or UPC fields may contain unique binary, numeric, or alphanumeric identifiers for the baseball glove. Contents of a description field may characterize the goods as a "baseball glove" or a "baseball mitt," for example.

In similar manner, other goods or services (e.g., the example goods 106 and 108) may be represented in data structures corresponding to the documents 112-114. More specifically, these data structures may contain fields and contents similar to those shown at 202 and 204 as discussed above.

The search index file may also include one or more search index terms 206, which serve as key fields or indexes that facilitate searching, for example, the content fields 204. In some instances, whoever provides the documents 110-114 may also specify the fields whose contents are used as search terms. FIG. 2 shows examples of search index terms 206a, 206b, 206e, and 206n. As indicated by dashed lines 208a and 208b, the field contents 204a and 204b may be presented as search index terms 206a and 206b, respectively. Similarly, dashed lines 208c and 208n indicate that field contents from the documents 112 and 114 may be presented as search index terms 206c and 206n, respectively.

The foregoing discussion pertains to pre-processing that may be performed to prepare for responding to keyword searches submitted to, for example, a website by visitors to the website. However, the discussion now presents a brief example of a search scenario, before returning to additional description of pre-processing techniques.

Returning to the baseball glove example, assume that a visitor to the website submits a keyword search including the terms "baseball glove." In responding to this search, the website may submit the search terms "baseball glove" to the search index file 120. In turn, the website (or a server provided as part thereof) may compare the input search terms "baseball glove" to the search index terms 206. Assume that a field 202*a* is a product description field, that the field contents 204*a* contains the text "baseball glove," and that these field contents are presented as a search index term 206*a*. In this example, the website may match the input search terms "baseball glove" to the text "baseball glove" as it appears in the search index term 206*a*. In this event, the website may retrieve the document (e.g., 110) that corresponds to the matching search index term, and return this document as a response to the query.

Figure 3:
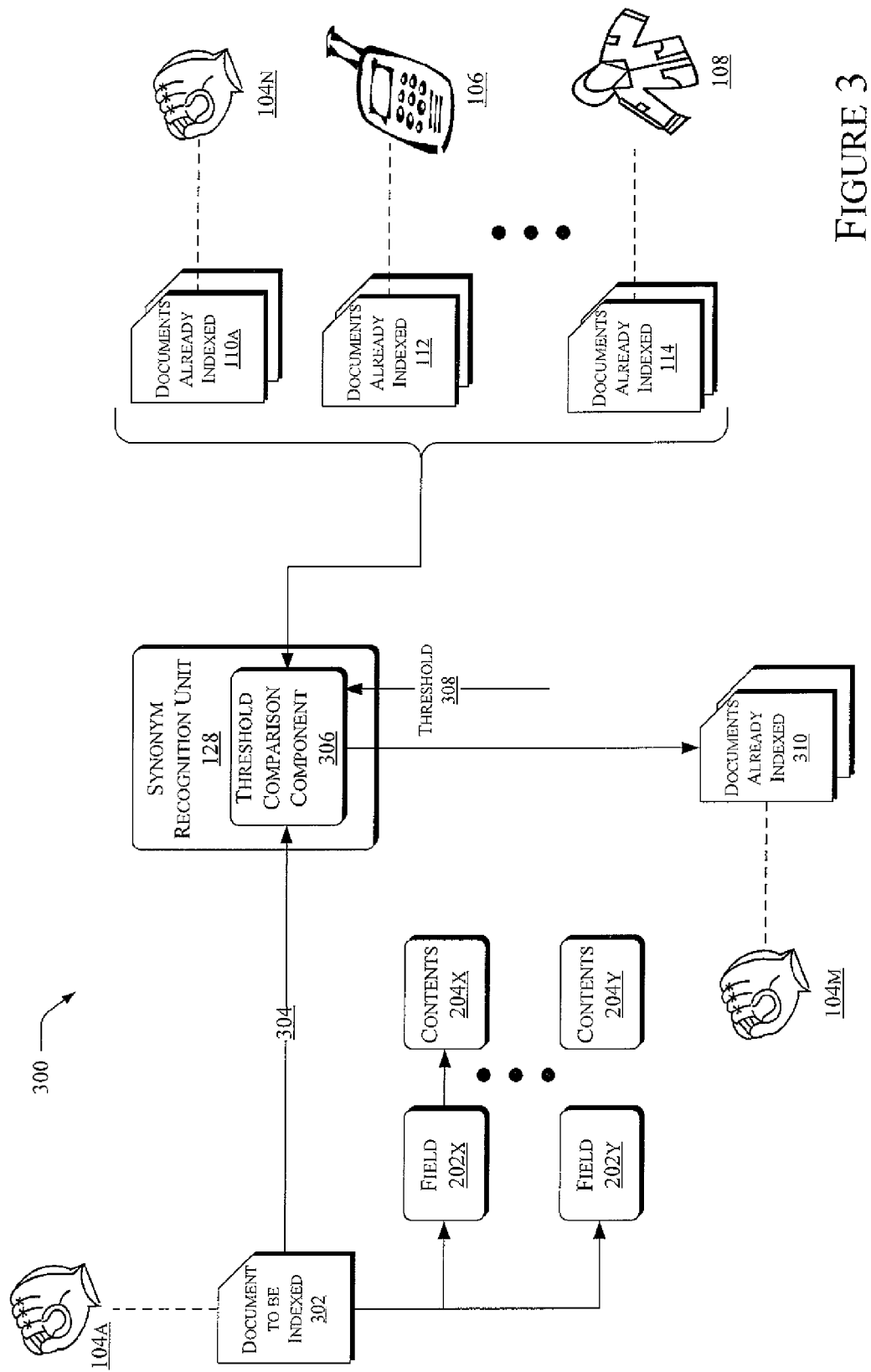
FIG. 3 is a block diagram of components and data flows related to indexing an input document into the search index file.

Having described the data structures suitable for implementing a search index file in FIG. 2, the discussion now proceeds to a description of components and data flows related to indexing an input document into the search index file, now presented with FIG. 3.

FIG. 3 illustrates components and data flows 300 related to indexing an input document into a search index file. For convenience and conciseness of description, but not to limit possible implementations, certain items described previously are carried forward into FIG. 3, and denoted by the same reference numbers.

FIG. 3 denotes at 302 an input document to be indexed into a search index file. FIG. 1 shows an example of a search index file at 120. The input document 302 may include one or more fields, two examples of which are shown at 202*x* and 202*y*. These fields may contain contents, denoted generally at 204*x* and 204*y*. The input document may be associated with a particular type of good or service, represented generally in FIG. 3 at 104*a*. In the example shown in FIG. 3, the good may be a particular baseball glove. Thus, the fields 202 and the contents 204 may convey various information or parameters relating to the baseball glove.

The search index construction unit 126 may receive the document 302 for indexing, as indicated by the line 304. The search index construction unit may include a threshold comparison component 306, which compares the fields and/or contents of the input document 302 to the fields and/or contents of a plurality of other documents that have already been indexed into the search index file 120. FIG. 3 shows examples of these existing documents at 110*a*, 112, and 114. Assuming a general website implementation, these existing documents may represent individual web pages or other content available through the website merchant. Assuming a website merchant implementation, these existing documents may represent different goods or services that are accessible or available through the website merchant, such as sporting goods represented at 104*n*, electronic items represented at 106, apparel represented at 108, or the like. As described above, these goods may be associated with respective categories.

The existing documents 110*a*, 112, and 114 may contain fields and/or contents, similar to those shown in FIGS. 2 and 3 at 202 and 204. One function of the threshold comparison component 306 is to compare the fields and/or contents of the input document 302 to those of the existing documents 110*a*, 112, and 114. As detailed further herein, this comparison facilitates the identification of terms appearing within the input document that may be synonyms with terms appearing within the existing documents. However, the likelihood of such synonyms appearing in the input document may depend on how closely the input document relates to the existing documents. Assume, for example, that the input document 302 relates to a baseball glove, and that the existing documents 110*a*, 112, and 114 relate to sporting goods, electronics, and apparel, respectively. In this case, terms appearing in the input document 302 may most likely be synonyms with terms appearing in the existing document 110*a*, because both documents relate to sporting goods.

The threshold comparison component 306 performs a preliminary thresholding or filtering on the existing documents 110*a*, 112, and 114. More specifically, the threshold comparison component may determine which of these existing documents are sufficiently closely related to the input document 302 that terms appearing within these documents may be synonyms for one another. The threshold comparison component may perform this thresholding or filtering operation by comparing the fields and/or contents of the input document (e.g., 302), in turn, with the fields and/or contents of the existing documents (e.g., 110*a*, 112, and 114). If the documents being compared contain fields that have similar names, types, contents, or the like, then the documents may pertain to subject matter this is closely related, such that synonyms may appear within the documents.

In this manner, the threshold comparison component may capitalize on the proposition described in the example introduced above involving the input document 302 and the existing document 110*a*. More specifically, if both documents relate to sporting goods, it is more likely that these documents include similar fields and/or contents. Thus, the threshold comparison component may determine how many fields and/or contents are similar between the input document 302 and the existing document 110*a*.

To make the foregoing threshold determination, the threshold comparison component may receive a threshold parameter as input, denoted generally at 308. This threshold 308 indicates how similar the fields and/or contents of the input document 302 and the existing document 110*a* are to be, before these two documents are related enough to contain likely synonyms. Put differently, the threshold 308 specifies how similar the fields and/or contents of the existing documents (e.g., 110*a*, 112, and 114) are to those of the input document (e.g., 302) for the existing document to survive the filtering or thresholding process.

In possible implementations, the threshold 308 may be specified as a percentage, expressing how closely the two documents being compared relate to one another. For example, a threshold value of 75% may indicate that approximately 75% of the fields and/or content within the input document 302 match or are similar to fields and/or content within the existing documents 110*a*, 112, or 114. For example, the input document 302 and one or more of the existing documents 110*a*, 112, or 114 may all contain fields that list the colors, manufacturers, brands, types, SKUs/UPCs, or other parameters of the corresponding items. This scenario provides but one example of matching or similar fields between or among the fields of the various documents.

In an example of dissimilarity, one document might contain a field for a relatively esoteric parameter pertaining to a given item. However, the other documents may not contain corresponding fields for this esoteric parameter. This scenario provides but one example of dissimilarity between or among the fields of the various documents.

In another example, the contents of these fields as contained in different documents may be similar or dissimilar. As an example of content similarity, two documents may contain a color field that contains the textual contents "brown." As an example of content dissimilarity, the respective color fields might contain the textual contents "brown" and "dark beige."

FIG. 3 denotes at 310 those existing documents that pass the thresholding or filtering process and are output from the threshold comparison component. In the example shown in FIG. 3, the output documents 310 generally relate to sporting goods, as denoted at 104m, because the input document 302 relates also to sporting goods. The existing document 110a, pertaining to sporting goods 104n, may be included in the documents 310.

In some instances, the thresholding process may consider the categories of the items 104n, 106, and 108, as compared to the category of the new item 104a. Those documents corresponding to items that are in the same or similar categories as the new item 104a (e.g., 104n) may be more likely to pass the thresholding process shown in FIG. 3. On the other hand, the thresholding process may exclude some documents that relate to items in other categories (e.g., 106 and 108).

The threshold 308 may be set by trial or experimentation, whether by human personnel or by automated processes. Raising the threshold may result in fewer existing documents passing the threshold and being output at 310. Those output documents 310 may be more likely to include synonyms with the input document 302. Lowering the threshold may result in more existing documents passing the threshold and being output at 310, but these documents may include more "false positives," i.e., terms that may appear to be synonyms, but actually are not synonyms.

The thresholding process shown in FIG. 3 results in a set of existing documents 310 that are likely to contain synonyms with the input document 302. Additionally, the thresholding process enables recognition of terms appearing in the documents 302 and 310 that may be synonyms within a given context. For example, if the input document 302 relates to sporting goods, and threshold 308 is set high enough to admit only existing documents that relate to sporting goods, then any synonyms detected between these documents (as detailed below) may be recognized in the context of sporting goods.

Figure 4:
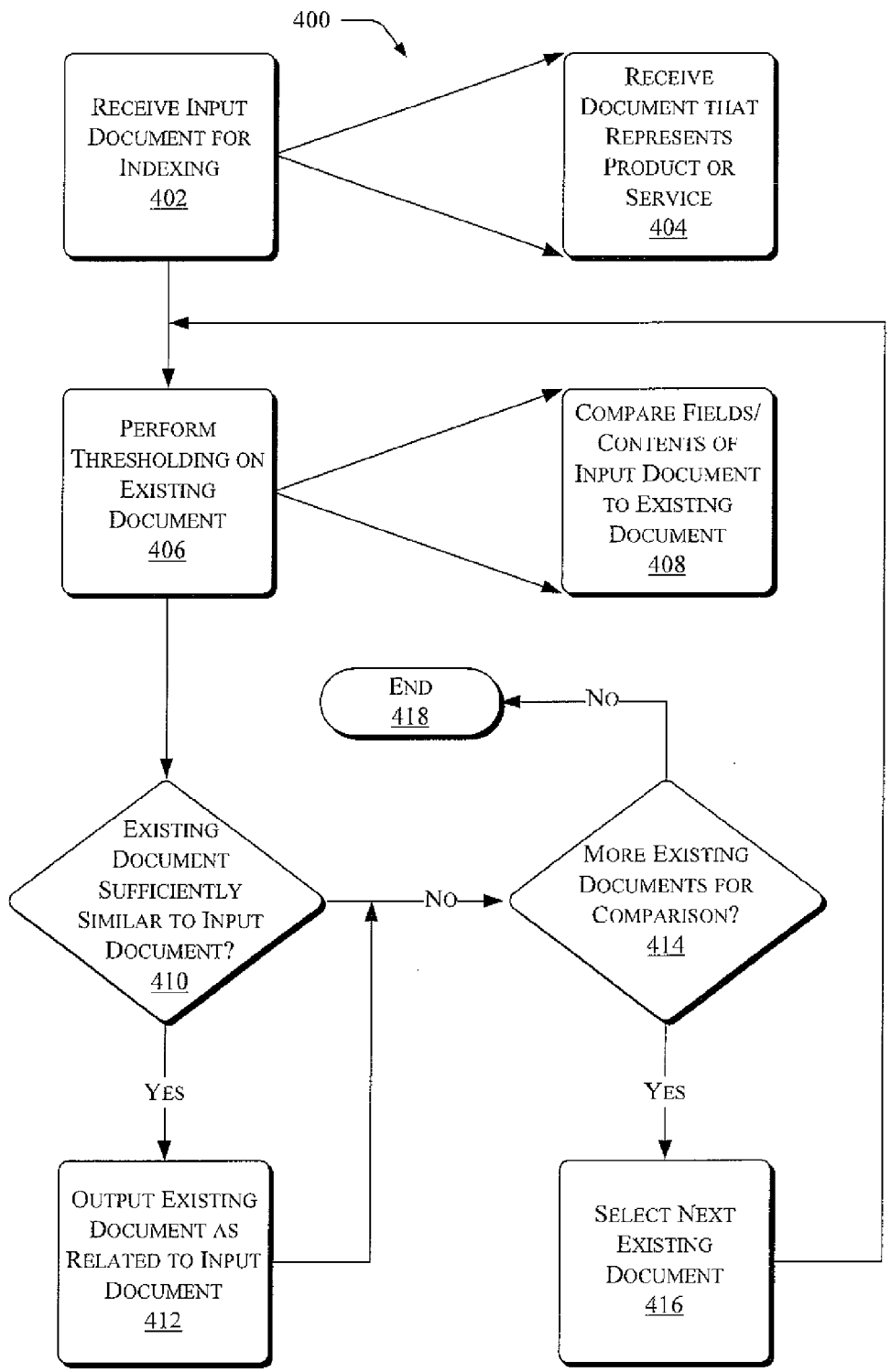
FIG. 4 is a flow diagram of a process for indexing the input document into the search index file.

Having described components and data flows related to indexing the input document into the search index file with FIG. 3, the discussion now turns to a description of a process for indexing the input document into the search index file, now presented with FIG. 4.

FIG. 4 illustrates a process 400 for indexing an input document into a search index file. More specifically, FIG. 4 illustrates a process for thresholding the input document while it is indexed. For convenience and conciseness of description, but not to limit possible implementations, the process 400 is described in connection with components shown in FIGS. 1-3 above. However, it is noted that at least portions of the process 400 may be performed with other components without departing from the spirit and scope of the description herein.

Block 402 represents receiving an input document (e.g., 302) for indexing into a search index file (e.g., 120). In some implementations, block 402 may include receiving input documents that relate to content posted at a website. In other implementations, the input document may relate to goods and/or services offered through a merchant website, as represented in block 404.

Block 406 represents thresholding an existing document, which is already indexed into the search index file, against the input document. Block 406 may include comparing fields and/or contents of the input document to the fields and/or contents of the existing document, as represented by block 408.

Block 410 represents evaluating whether the existing document is sufficiently similar to the input document that terms appearing in the two documents might be synonyms for one another. Block 410 may include performing a preliminary thresholding or filtering process, examples of which are described above with the threshold comparison component 306.

Continuing with decision block 410, if the existing document passes the threshold evaluation, then the process 400 may proceed to block 414, which represents outputting or identifying the existing document as passing the threshold for similarity to the input document. FIG. 3 shows examples of such output or identified documents at 310.

From block 410, if the existing document does not pass the threshold evaluation, then the process 400 may proceed to decision block 414. The process 400 may also reach decision block 414 after performing block 412. Decision block 414 represents testing whether the search index file contains any more existing documents to be thresholded against the input document. If not, the process 400 may proceed to an end state 418. However, if the search index file contains more existing documents, then the process 400 may proceed to block 416, which represents selecting a next existing document in the search index file for thresholding against the input document. Afterwards, the process 400 returns to block 406 to repeat the process with the newly-selected existing document.

Figure 5:
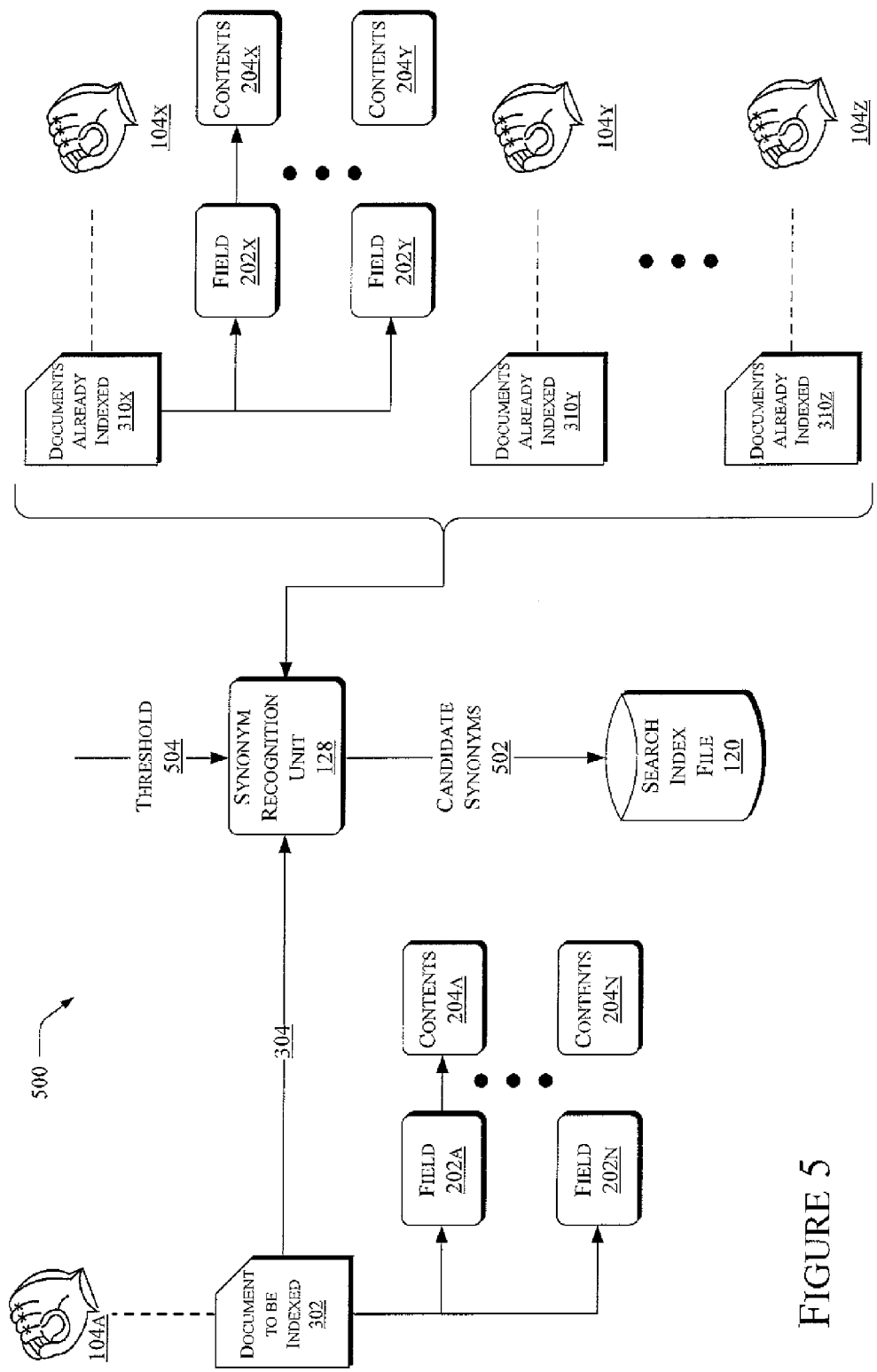
FIG. 5 is a block diagram of components and data flows for identifying candidate synonyms appearing in the input document.

Having described the process 400 for thresholding the input document while indexing it into the search index file with FIG. 4, the discussion now turns to a description of components and data flows related to identifying candidate synonyms appearing in the input document, now presented with FIG. 5.

FIG. 5 illustrates components and data flows 500 for identifying candidate synonyms appearing in an input document. For convenience and conciseness of description, but not to limit possible implementations, certain items described previously are carried forward into FIG. 5, and are denoted by the same reference numbers.

As shown in FIG. 5, the input document (e.g., 302) is input to the synonym recognition unit 128. As described previously, the input document may contain any number of fields (e.g., 202a and 202n) and contents (e.g., 204a and 204n).

The synonym recognition unit 128 then processes the fields and/or contents of the input document 302 against the existing documents that survived the preliminary thresholding process shown in FIGS. 3 and 4. Examples of such surviving documents are shown at 310x, 310y, and 310z (collectively, 310), but the documents 310 may include any number of individual documents. The surviving documents 310 may include fields (e.g., 202x and 202y) and/or contents (e.g., 204x and 204y).

Because the documents 310 survived the preliminary thresholding or filtering process shown in FIGS. 3 and 4, these documents may be expected to be fairly similar in structure and/or content to the input document 302. For example, assuming that the input document 302 relates to a baseball glove being offered through a merchant website, then any documents 310 that survive the preliminary thresholding process may be expected to relate specifically to other baseball gloves (e.g., the document 310x and item 104x). More generally, these documents 310 may be expected to relate to sporting goods (e.g., the documents 310y and 310z and items 104y and 104z).

In more detail, the synonym recognition unit 128 may identify candidate synonyms in the input document 302 by comparing fields and/or contents of that document to the fields and/or contents of the surviving documents 310. More specifically, the synonym recognition unit 128 may identify those portions of the surviving documents 310 that contain terms or phrases that are largely similar to terms or phrases that appear in the input document.

In some cases, there may be differences between terms or phrases appearing in analogous places in the input document and the surviving documents. For example, a field 202*a* in the input document 302 may be a description field that identifies the goods to which the input document relates. The contents 204*a* of this field 202*a* may include the text "baseball glove." Turning to the surviving documents 310, a field 202*x* in the surviving document 310*x* may also be a description field, with the related contents field 204*x* including the text "baseball mitt." In this example, the phrases "baseball glove" and "baseball mitt" exhibit some aspects of similarity and some aspects of dissimilarity. More specifically, the term "baseball" appears on both descriptions; however, the terms "glove" and "mitt" differ. As detailed further below, the synonym recognition unit 128 may infer that the terms "glove" and "mitt" are synonyms for one another in the context of sporting goods.

Generalizing from the above example, the synonym recognition unit 128 may recognize how much similarity and dissimilarity exists between the contents appearing in the input document and in a given surviving document. If some level of similarity exists between textual matter appearing in the two documents, then any dissimilar text may be synonyms. The synonym recognition unit may output any such dissimilar portions of the textual matter, as denoted generally as candidate synonyms 502. These candidate synonyms 502 may be processed into a data store, such as the search index file 120.

The synonym recognition unit 128 may employ a threshold 504 to specify how much of the textual matter appearing in the two documents is to be similar, before inferring that the dissimilar textual matter might be synonyms. Like the threshold 308 shown in FIG. 3, the threshold 504 may be set through trial and experimentation to yield optimal recognition of dissimilar textual matter as synonyms.

Figure 6:
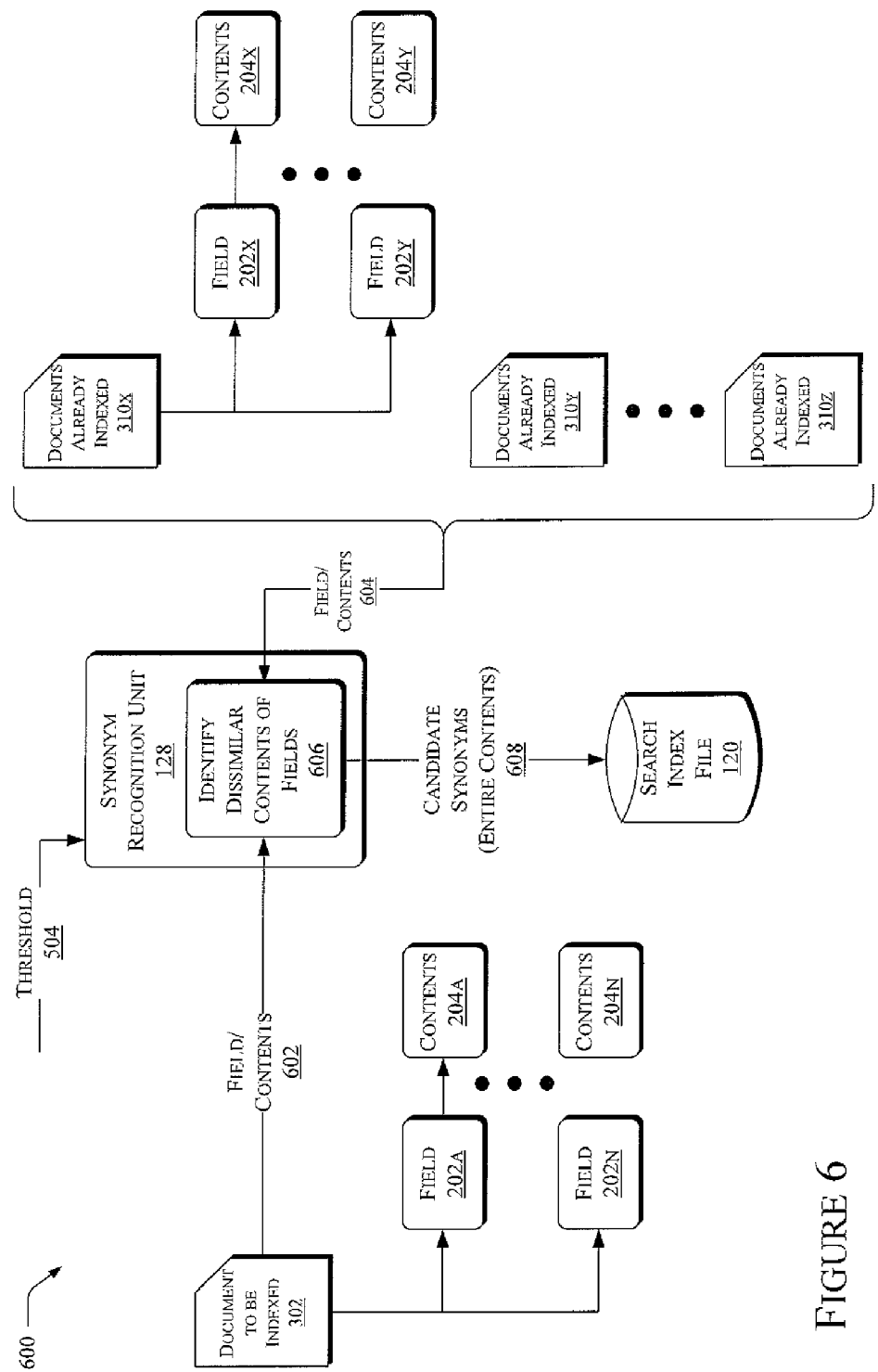
FIG. 6 is a block diagram of components and data flows for identifying candidate synonyms in a field of the input document.

Having described components and data flows 500 for identifying candidate synonyms appearing in an input document with FIG. 5, the discussion now turns to a more detailed description of components and data flows for identifying candidate synonyms in an entire field of the input document, now presented with FIG. 6.

FIG. 6 illustrates components and data flows 600 for identifying candidate synonyms in a field of the input document (e.g., 302). For convenience and conciseness of description, but not to limit possible implementations, certain items described previously are carried forward into FIG. 6, and denoted by the same reference numbers.

In the example shown in FIG. 6, the input document may contain any number of fields 202*a-n* and contents 204*a-n*. The synonym recognition unit 128 may receive these fields 202*a-n* and contents 204*a-n* as input, denoted generally at 602.

Turning to the existing documents 310*x-z*, and recalling previous discussion, the surviving or existing documents 310 may include fields 202*x-y* and contents 204*x-y*. The synonym recognition unit 128 may receive these fields 202*x-y* and contents 204*x-y* as input, denoted generally at 604.

The synonym recognition unit 128 may execute a process 606 that compares the input 602 to the input 604, and identifies dissimilar aspects of the input 602 that are dissimilar to corresponding aspects of the input 604. If enough of the fields 202 of the input document 302 and the surviving documents 310 have similar contents, then those fields that do not have similar contents might contain synonyms.

As example of the foregoing, assume that a plurality of fields 202*a* and contents 204*a* in the input document 302 contain similar information as a corresponding plurality of fields 202*x* and contents 204*x* in the existing document 310*x*. However, assume that the field 202*n* in the input document corresponds to the field 202*y* in the existing document 310*x*, but that the related contents 204*n* are different than the related contents 204*y*. For example, the fields 202*n* and 202*y* may be color fields, and the contents 204*n* and 204*y* may specify the color of the goods to which the documents 302 and 310*x* apply (e.g., a baseball glove, shoe, or the like). The contents 204*n* may include the text "brown", while the contents 204*y* may include the text "dark beige."

If the rest of the fields of the documents 302 and 310*x* are sufficiently similar to one another, then the process 606 may infer that these two documents relate to similar goods. For example, assume that the documents 302 and 310*x* each include four fields that are common between the two documents (e.g., a brand field, a manufacturer field, an item description field, and a SKU/UPC field), and that contain similar or identical contents. Assume further that the documents 302 and 310*x* both contain a fifth field that is also common between the two documents (e.g., a color field), but contains dissimilar contents (e.g., "brown" versus "dark beige"). In light of the preponderance of similar fields and field contents between the two documents 302 and 310*x*, the process 606 may infer that these two documents relate to similar goods. It is noted that any percentage of similar fields may be suitable in different implementations, depending on experimentation, iteration, and past or projected results. Thus, the foregoing scenario is provided only for example, but does not limit possible implementations.

Having made this inference, the process 606 may also infer that the remaining, dissimilar fields contain candidate synonyms. Returning to the example of differing colors, if enough fields are similar between two documents, then the process 606 may infer that the two documents relate to similar (perhaps identical) goods. Thus, the process 606 may infer that the colors specified in those two documents, while dissimilar, are nevertheless synonyms for one another. Thus, the process 606 may infer that "brown" and "dark beige" are synonyms, and may report these colors as candidate synonyms 608.

In the example given in FIG. 6, the candidate synonyms 608 are expressed as synonyms that include the contents 204 considered as a whole. However, the foregoing description is equally applicable to considering the contents 204 considered as individual sub-portions. This latter scenario is detailed further below in FIGS. 8 and 9.

The synonym recognition unit 128 or, more specifically, the process 606 may be responsive to the threshold signal 504. This threshold signal may indicate how many of the fields are to be similar before inferring that any differing fields are candidate synonyms.

The candidate synonyms 608 may be processed into a data store, such as the search index file 120 described above. As described further below, these candidate synonyms may enable optimized searching operations.

Figure 7:
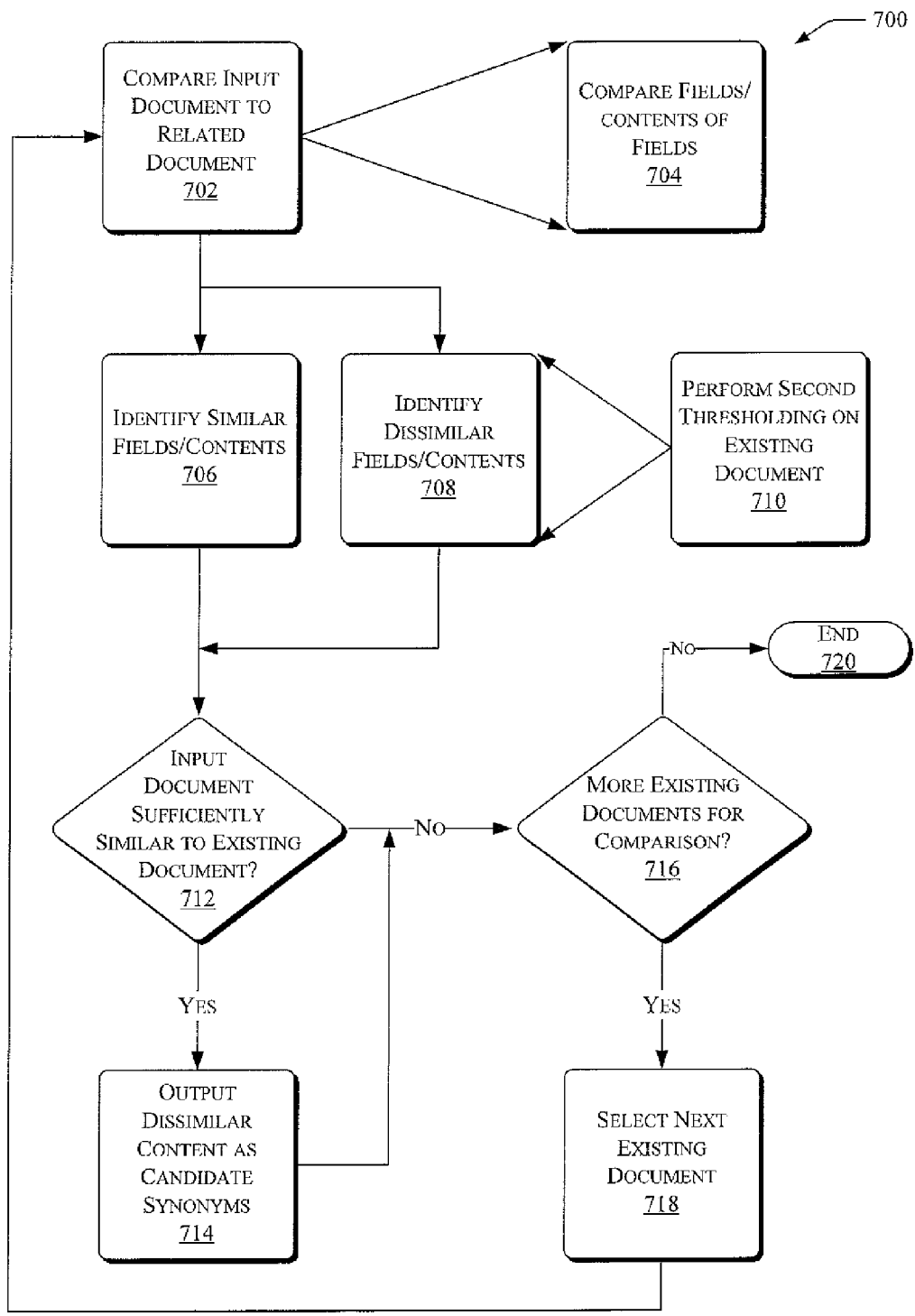
FIG. 7 is a flow diagram of a process for identifying candidate synonyms in the fields of the input document.

Having described components and data flows 600 for identifying candidate synonyms in a field of the input document with FIG. 6, the discussion now turns to a description of a process for identifying candidate synonyms in a field of the input document, now presented with FIG. 7.

FIG. 7 illustrates a process 700 for identifying candidate synonyms in a field of the input document. For convenience and conciseness of description, but not to limit possible implementations, the process 700 is described in connection with components shown in FIGS. 1-6 above, for example the synonym recognition unit 128 and the process 606, as shown in FIG. 6. However, it is noted that at least portions of the process 700 may be performed with other components without departing from the spirit and scope of the description herein.

Block 702 represents comparing an input document (e.g., 302) to a given output document that has survived a preliminary thresholding process, such as the thresholding described in FIGS. 3 and 4 above. FIG. 6 shows examples of such output documents at 310.

Block 702 may include comparing respective fields of the input document and the output document, as represented by block 704. Examples of such respective fields that may be compared are shown at 202a and 202x in FIG. 6. Block 704 may also include comparing respective contents of particular fields. FIG. 6 shows examples of such respective contents at 204a and 204x.

Block 706 represents identifying fields and/or contents of fields that are similar between the compared documents. In parallel or in serial with block 706, block 708 represents identifying any fields and/or contents of fields that are dissimilar between the compared documents. Taken together, blocks 706 and 708 may be considered as implementing a second thresholding on the existing document, as represented by block 710. The previous thresholding operation is represented by, for example, block 306 in FIG. 3.

Decision block 712 represents evaluating whether the amount of similar content found between the compared documents is sufficient to justify or support an inference that any dissimilar content between the compared documents are candidate synonyms. Block 712 may include using a threshold signal (e.g., 504 in FIG. 6). If the amount of similar content is sufficient to justify the inference, the process 700 may proceed to block 714, which represents outputting or identifying any dissimilar content between the compared documents as candidate synonyms. FIG. 6 shows an example of such candidate synonyms at 608, and describes an example scenario in which the color fields for compared documents include the respective text strings "brown" and "dark beige."

From decision block 712, if the amount of similar content is not sufficient to justify the inference, then the process 700 may proceed to decision block 716. The process 700 may also reach decision block 716 after performing block 714.

Decision block 716 represents evaluating whether additional documents remain for comparison to the input document. If so, the process 700 may proceed to block 718, which represents selecting another existing document for comparison to the input document. The process 700 then returns to block 702, to repeat the process with the newly-selected existing document.

From decision block 720, if no additional documents remain for comparison to the input document, the process 700 may proceed to end state 720. The process 700 may wait in state 720 for the arrival of another input document for processing.

Figure 8:
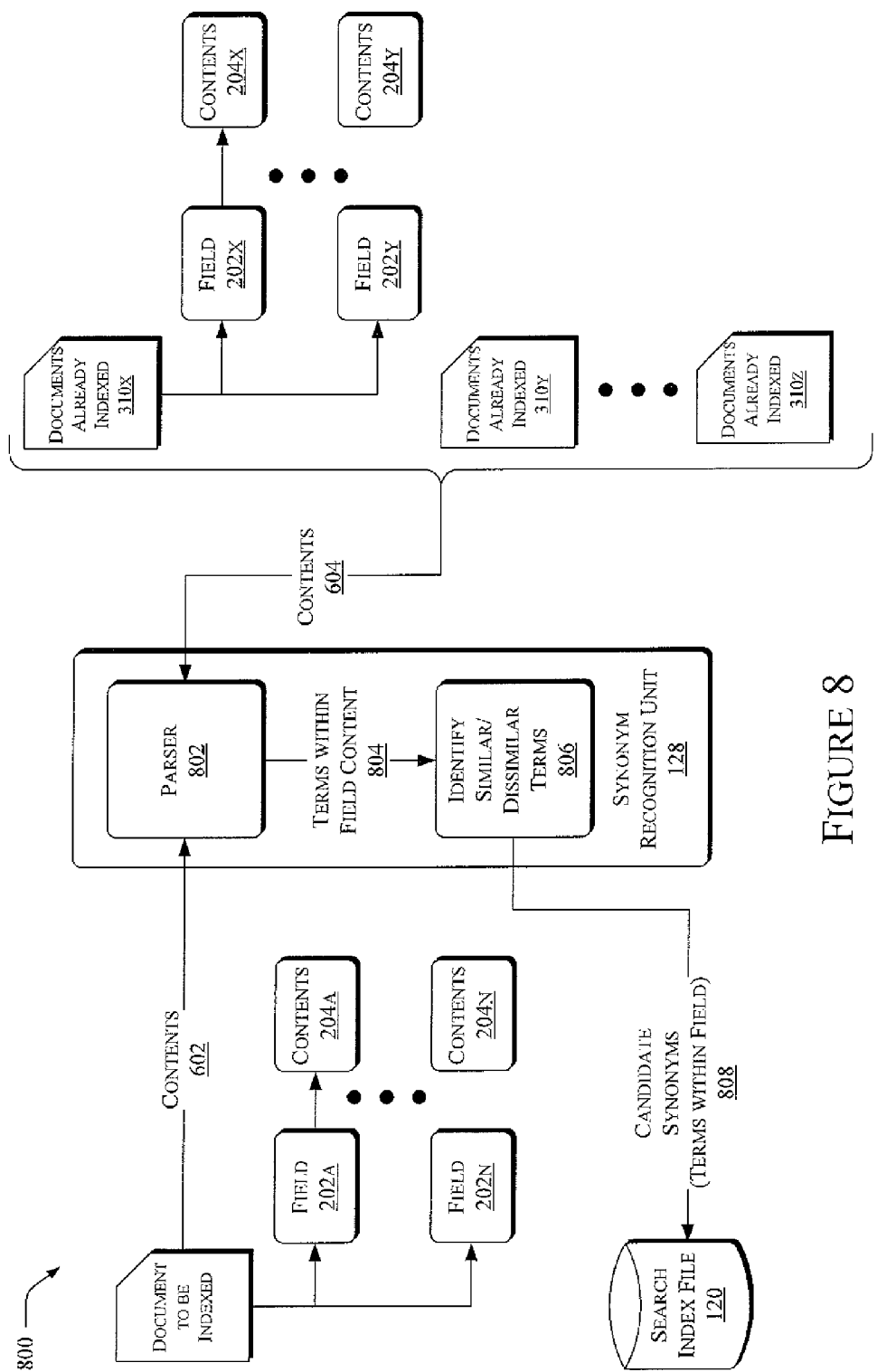
FIG. 8 is a block diagram of components and data flows for identifying synonyms within portions of the fields of the input document.

Having described the process 700 for identifying candidate synonyms in an entire field of the input document with FIG. 7, the discussion now turns to a description of components and data flows related to identifying synonyms within portions of the fields of the input document, now presented with FIG. 8.

FIG. 8 illustrates components and data flows 800 for identifying synonyms within portions of the fields of the input document 302. For convenience and conciseness of description, but not to limit possible implementations, certain items described previously are carried forward into FIG. 8, and denoted by the same reference numbers.

FIG. 8 denotes the contents of the input document as input to the synonym recognition unit 128 at 602. The input 602 may include fields (e.g., 202a-n) and/or contents of those fields (e.g., 204a-n). Turning to the documents already indexed into the search index file 120 and being compared to the input document, the contents of these existing documents as input to the synonym recognition unit are denoted at 604. The input 604 may include fields (e.g., 202x-y) and/or contents of those fields (e.g., 204x-y).

The synonym recognition unit 128 may include a parser 802, which parses the inputs 602 and 604 into terms that appear within the field content, denoted generally at 804. For example, returning to the "baseball glove"-"baseball mitt" example described above, assume that the field 204a in the input document 302 contains the text "baseball glove," and the field 204x in the existing document 310x contains the text "baseball mitt." The parser 802 may process the text "baseball glove" from the input document 302 into the individual terms "baseball" and "glove," and may process the text "baseball glove" from the existing document 310x into the individual terms "baseball" and "mitt."

The synonym recognition unit 128 may also include a process 806 that received as input the parsed terms 804. The process 806 may identify similar and/or dissimilar portions of the individual terms 804, and output those terms that are dissimilar as candidate synonyms. The output candidate synonyms are denoted generally at 808. Returning to the example in which the input 602 includes the text "baseball glove", and the input 604 includes the text "baseball mitt", the identification process 806 may correlate the terms "baseball" appearing in both input text strings, but then recognize that the term "mitt" differs from "glove". In this event, the identification process 806 may output the terms "mitt" and "glove" as candidate synonyms 808.

Having described the components and data flows 800 for identifying synonyms within portions of the fields of the input document 302 with FIG. 8, the discussion now turns to a description of a process for identifying synonyms within portions of the fields of the input document, now presented with Figure.

Figure 9:
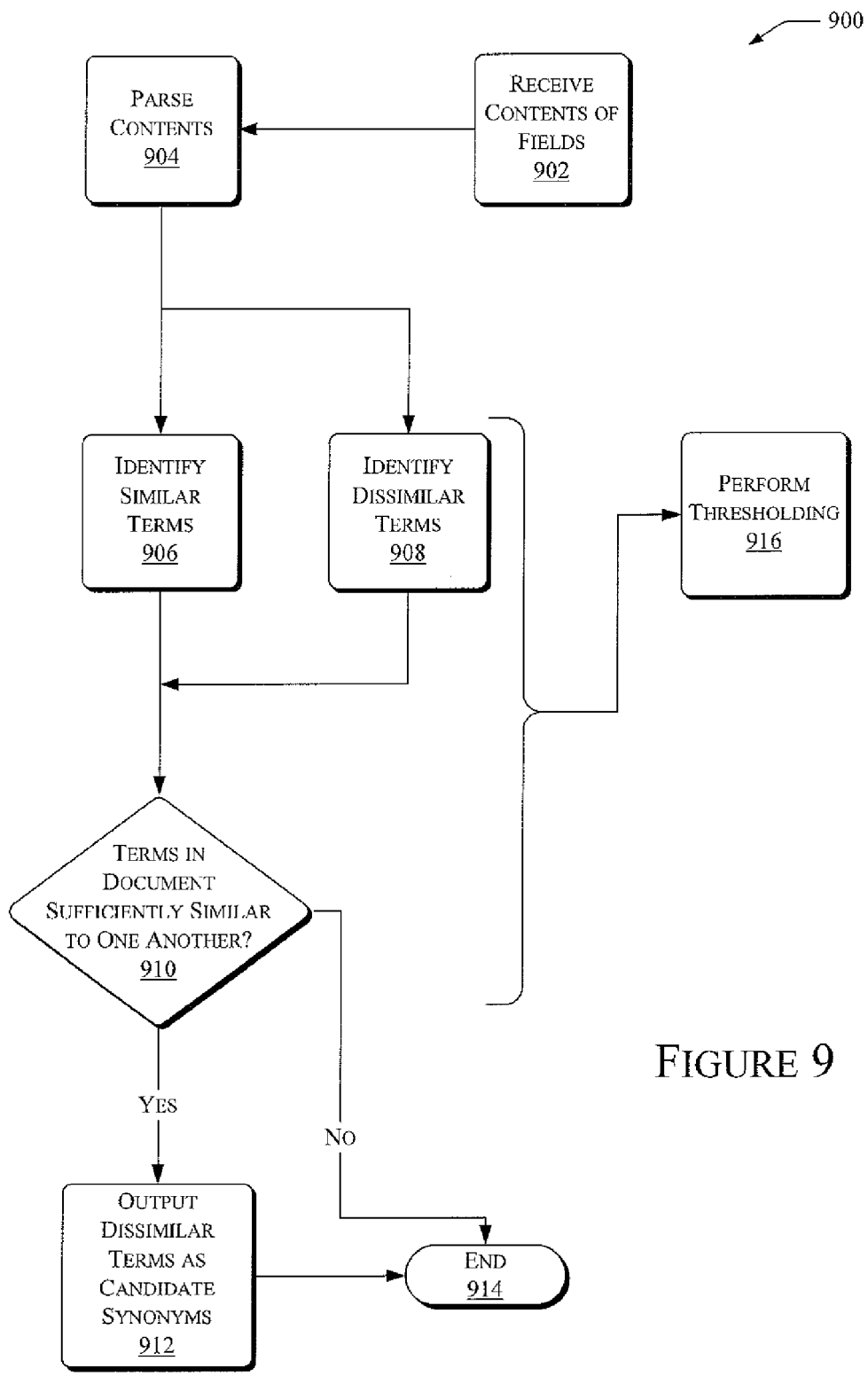
FIG. 9 is a flow diagram of a process for identifying synonyms within portions of the fields of the input document.

FIG. 9 illustrates a process 900 for identifying synonyms within portions of the fields of the input document. For convenience and conciseness of description, but not to limit possible implementations, the process 900 is described in connection with components shown in FIGS. 1-8 above, for example the synonym recognition unit 128 and the relates sub-processes 802 and 806, as shown in FIG. 8. However, it is noted that at least portions of the process 900 may be performed with other components without departing from the spirit and scope of the description herein.

Block 902 represents receiving contents of fields from an input document (e.g., 302) that is to be indexed into, for example, a search index file (e.g., 120). Block 902 may also include receiving contents of fields from at least one existing document that is already indexed into the search index file (e.g., 310x-z).

Block 904 represents parsing textual contents of the input fields as received in block 902. Block 904 may be performed by a parser (e.g., 802), and may include processing an input textual phrase into its individual constituent terms. For example, block 904 may include parsing the phrase "baseball glove" into the terms "baseball" and "glove."

Block 906 represents identifying any similar terms appearing in the inputs as received from the input document and the existing document. Block 906 may include comparing the terms as received from a parsing process, and locating any terms that appear in both documents. In parallel or serially with block 906, block 908 represents identifying any dissimilar terms appearing in the documents. Continuing the previous example, block 906 may include identifying the term "baseball" as appearing in both of the phrases "baseball glove" and "baseball mitt," while block 908 may include identifying the terms "glove" and "mitt" as being dissimilar.

Having identified any similar and/or dissimilar terms appearing in the two input phrases, decision block 910 represents evaluating whether the two input phrases exhibit enough similarity to justify inferring that any dissimilar terms are probably synonyms. For example, returning to the "baseball glove-baseball mitt" example above, these two phrases each contain two terms, with one term ("baseball") occurring in both phrases. In this particular example, this one common term may be sufficient to justify inferring that the dissimilar terms ("glove" and "mitt") are candidate synonyms.

It is noted that any percentage of similar terms appearing within phrases may be suitable in different implementations, depending on experimentation, iteration, and past or projected results. Thus, the foregoing scenario is provided only for example, but does not limit possible implementations.

Returning to decision block 910, If the two input phrases exhibit sufficient similarity, the process 900 may proceed to block 912, which represents outputting the dissimilar portions of the input phrases as candidate synonyms (e.g., 808). Afterwards, the process 900 may reach end state 914, to await the next iteration of the process 900.

Returning to decision block 910, if the two input phrases do not exhibit enough similarity to justify inferring that any dissimilar terms are probably synonyms, then the process 900 may proceed directly to end state 914.

The blocks 906, 908, and 910 may be viewed as applying a thresholding operation to the terms that make up the content received in block 902. FIG. 9 generally represents this thresholding operation as by block 916.

Figure 10:
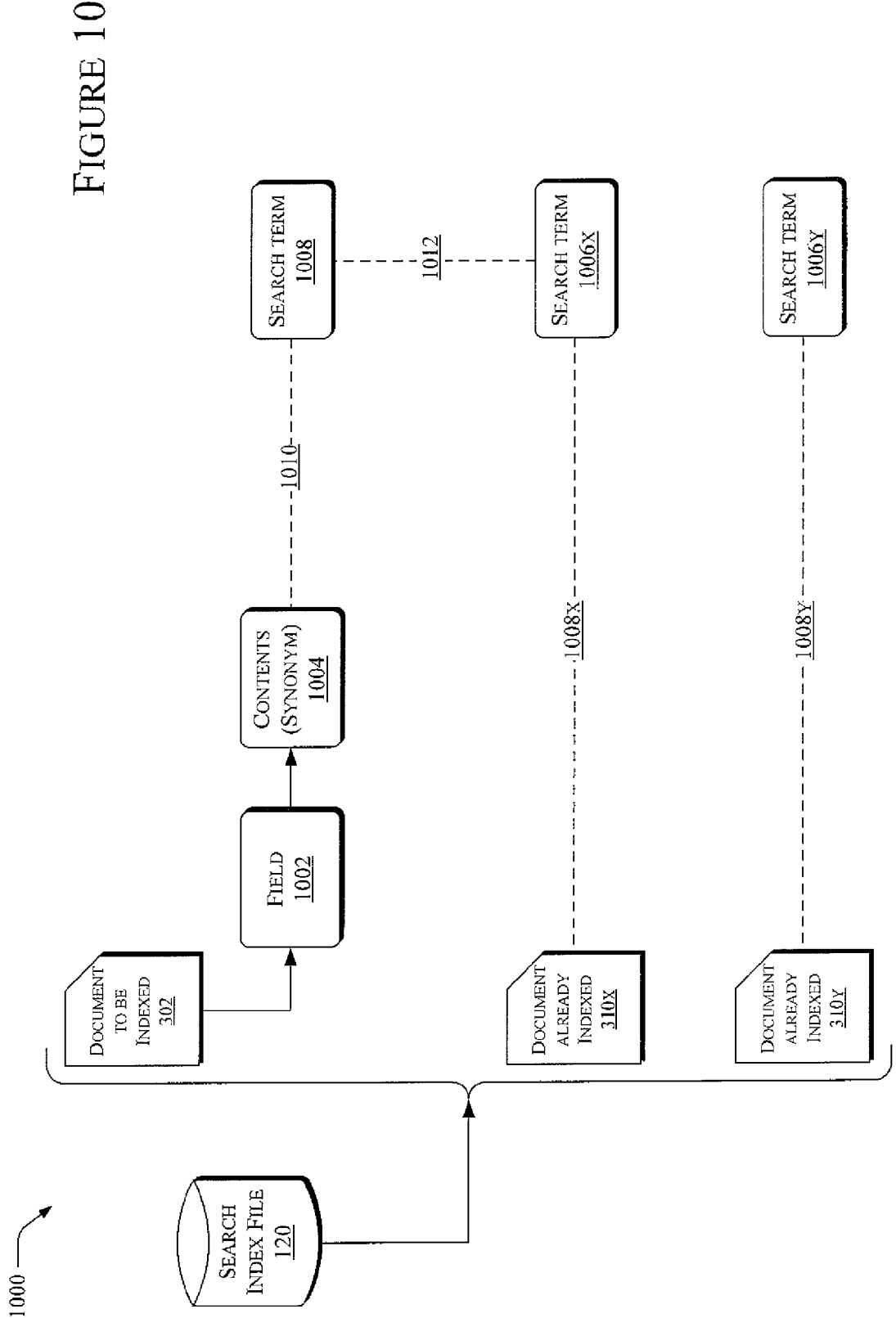
FIG. 10 is a block diagram of components and data flows related to merging detected candidate synonyms into the search index file.

Having described the process 900 for identifying synonyms within portions of the fields of the input document with FIG. 9, the discussion now turns to a description of components and data flows related to merging detected candidate synonyms into the search index file, now presented with FIG. 10.

FIG. 10 illustrates components and data flows 1000 related to merging detected candidate synonyms into the search index file. For convenience and conciseness of description, but not to limit possible implementations, certain items described previously are carried forward into FIG. 10, and denoted by the same reference numbers.

The input document 302 to be indexed into the search index file 120 may include at least one field 1002 that is associated with content 1004. Using any of the techniques described previously, the content 1004 may be recognized as containing one or more candidate synonyms. More specifically, the content 1004 may contain synonyms with terms or phrases occurring within the documents 310$x$ and 310$y$, which are already indexed into the search index file. As such, the search index file may have extracted search terms 1006$x$ and 1006$y$, respectively, from these previously-indexed documents 310$x$ and 310$y$, as represented by the dashed lines 1008$x$ and 1008$y$.

In this scenario, assume that one or more terms or phrases occurring in the contents 1004 are candidate synonyms with terms or phrases that occur in the existing document 310$x$. These terms or phrases from the input document 302 may be extracted for use as search terms 1008, as represented by the dashed line 1010. However, because these terms or phrases are also candidate synonyms for terms in the document 310$x$, these teems or phrases may be merged with those terms in the document 310$x$, as represented by the dashed line 1012. As detailed with FIGS. 12 and 13 below, this association or linkage may enable optimizations at search-time.

Figure 11:
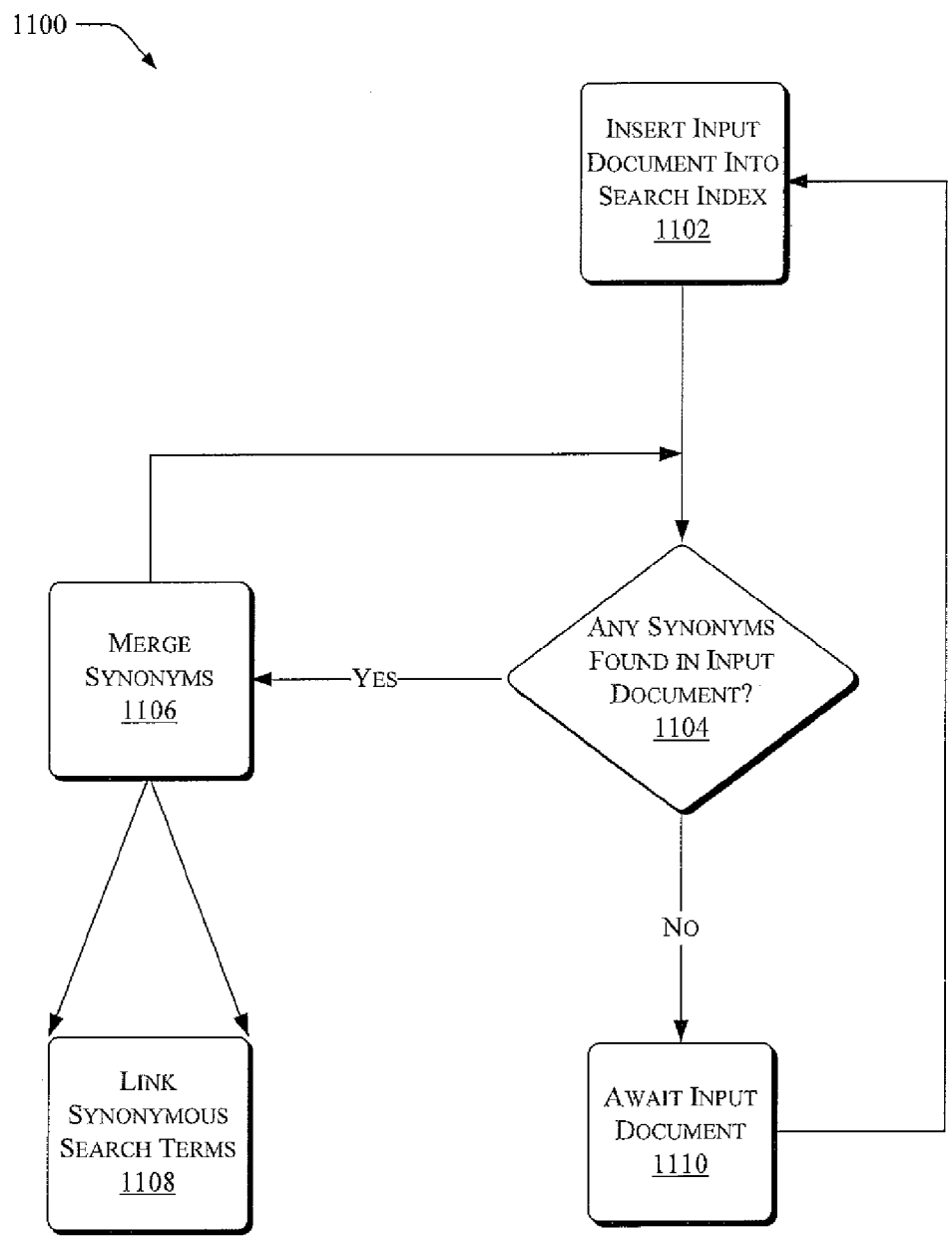
FIG. 11 is a flow diagram of a process for merging detected candidate synonyms into the search index file.

Having described the components and data flows 1000 related to merging detected candidate synonyms into the search index file with FIG. 10, the discussion now turns to a description of a process for merging detected candidate synonyms into the search index file, now presented with FIG. 11.

FIG. 11 illustrates a process 1100 for merging detected candidate synonyms into the search index file. For convenience and conciseness of description, but not to limit possible implementations, the process 1100 is described in connection with components shown in FIGS. 1-10 above, for example, the synonym recognition unit 128 and components and data flows shown in FIG. 10. However, it is noted that at least portions of the process 1100 may be performed with other components without departing from the spirit and scope of the description herein.

Block 1102 represents indexing an input document (e.g., 302) into a search index file (e.g., 120). Block 1102 may include extracting search terms (e.g., 1008) from certain contents of the input document.

Block 1104 represents evaluating whether any synonyms have been found in the input document. For example, block 1104 may include evaluating whether any candidate synonyms (e.g., 502, 608, 808) have been reported for the input document. If so, the process 1100 may proceed to block 1106, which represents logically merging the synonyms in the input document (e.g., 1004) with any matching synonyms in one or more of the existing documents, such that a subsequent keyword search specifying one of the synonyms will also return all of the merged synonyms. More specifically, block 1106 may include linking synonymous search terms (e.g., 1012) within a data structure that stores the search terms, as represented by block 1108. The data structure may accomplish this linkage using any convenience mechanism that logically connects the synonyms appearing in different documents, e.g., pointers, handles, or other constructs. The search index file described herein (e.g., 120) is but one possible example of such a data structure.

Returning to decision block 1104, if no synonyms were recognized in the input document, then the process 1100 may proceed to block 1110, which represents awaiting the next input document for indexing into the search index file.

Figure 12:
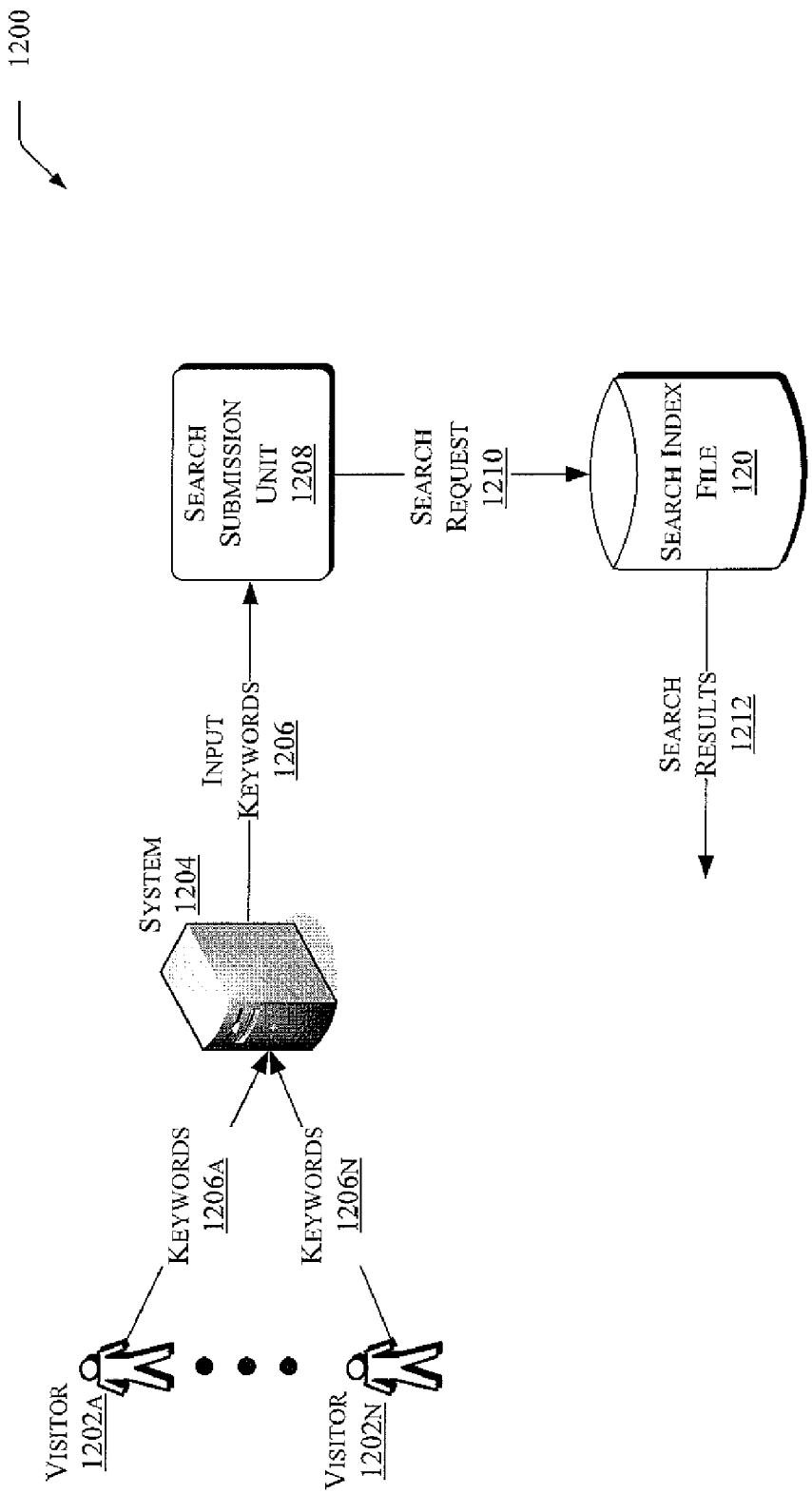
FIG. 12 is a block diagram of components and data flows for an operating environment related to searching techniques optimized by detecting synonyms and merging synonyms into search indexes.

Having described the components and data flows 1100 related to merging detected candidate synonyms into the search index file with FIG. 11, the discussion now turns to a description of components and data flows related to searching techniques optimized by detecting synonyms and merging synonyms into search indexes, now presented with FIG. 12.

FIG. 12 illustrates components and data flows for an operating environment 1200 related to searching techniques optimized by detecting synonyms and merging synonyms into search indexes. FIG. 12 illustrates scenarios in which one or more visitors 1202 interact with a server-based system 1204, which may be, for example, a website. FIG. 12 shows two visitors 1202$a$ and 1202$n$ for convenience only, but the operating environment 1200 may support any number of visitors.

The visitors may search for resources on the server-based system by submitting keywords 1206. FIG. 12 shows two example keyword searches at 1206$a$ and 1206$n$, as submitted respectively by visitors 1202$a$ and 1202$n$. These keywords may relate to documents or web pages hosted on the server-based system, to goods and/or services available through the server-based system, or any other content that may be hosted for remote access.

In some instances, the server-based system 1204 may be the same as the system 102, which is shown in FIG. 1. In these instances, the server-based system 1204 and the system 102 may support both search-time activities as well as any preprocessing related to such search-time activities. In other instances, the server-based system 1204 may be separate from the system 102, with the server-based system 1204 dedicated to search-time activities and the system 102 dedicated to preprocessing functions.

In the scenario shown in FIG. 12, the input keywords 1206 as received from the visitors may be routed to a search submission unit 1208. The search submission unit 1208 formulates a search request 1210 that incorporates the input keywords 1206, and queries the search index file 120 with at least the input keywords 1206. More specifically, the search submission unit 1208 compares the input keywords 1206 to the search terms extracted from the search index file 120 (e.g., 1006 and 1008 in FIG. 10). Referring briefly to both FIGS. 10 and 12, if the input keywords 1206 correspond to any of the search terms within the search index file, then the documents (e.g., 302, 310) from which these search terms were extracted may be returned as search results 1212.

Assume, however, that the input keywords 1206 match with the search term 1008. Recall that during the pre-search processing shown in FIGS. 1-11, the search term 1008 may be linked not only to the document 302 from which the search term was extracted (e.g., 302), but also to any other documents that contain synonyms (e.g., 310x). Put differently, the search term 1008 as linked to the documents 302 and 310x effectively merges these two documents. The link 1012 provides an example mechanism for establishing this association between, for example, the documents 302 and 310x. Thus, if an input keyword 1224 matches the search term 1008, the search index file may return the document 302 from which the search term 1008 was extracted. However, by following any links 1012, the search index file may also locate and return any documents 310x that contain synonyms for the input keyword 1224, and have been merged with the document 302.

In this case, the search submission unit 1208 may submit only one search request 1210 for the input keywords 1206, but may still obtain search results 1212 that include any synonyms for the input keywords 1206. However, the search submission unit 1208 accomplishes this result without spawning and executing multiple search requests at search-time. By detecting synonyms during the preprocessing phase, and merging the synonyms in the search index file before search-time, the search submission unit 1208 effectively merges or combines searches across known synonyms ahead of time. In this manner, the search submission unit 1208 may avoid the overhead and search-time delays involved with performing multiple search requests.

Figure 13:
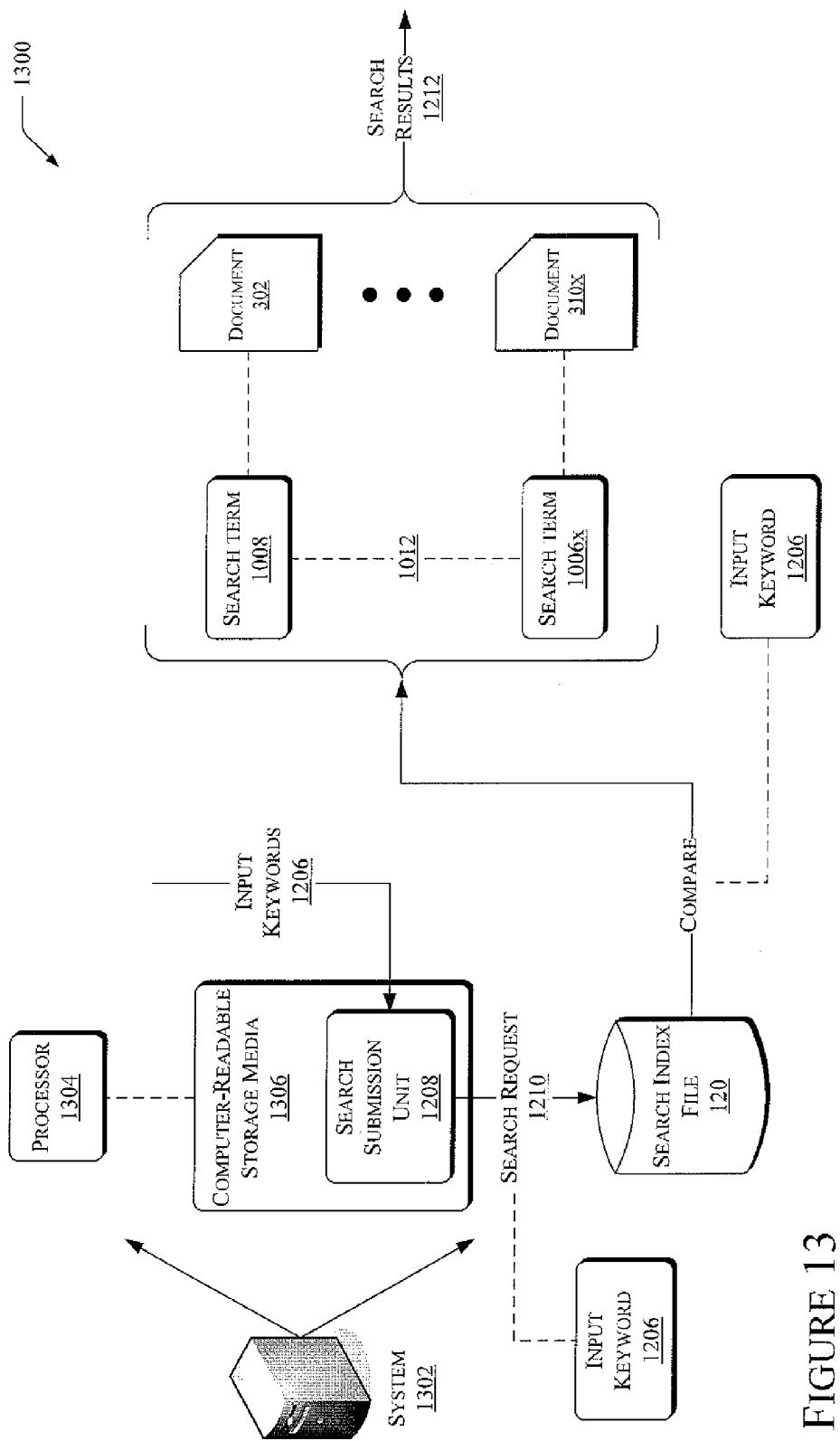
FIG. 13 is a block diagram of additional details of components and data flows for searching techniques optimized by detecting synonyms and merging synonyms into search indexes.

Having described the operating environments 1200 with FIG. 12, the discussion now turns to a more detailed description of operating environments related to searching techniques optimized by detecting synonyms and merging synonyms into search indexes, now presented with FIG. 13.

FIG. 13 illustrates components and data flows for an operating environment 1300 related to searching techniques optimized by detecting synonyms and merging synonyms into search indexes. For convenience and conciseness of description, but not to limit possible implementations, certain items described previously are carried forward into FIG. 13, and denoted by the same reference numbers.

The operating environment 1300 may include a server-based system 1302, which may be similar to the server-based system 1204 shown in FIG. 12, but is referenced separately in FIG. 13 for convenience. The server-based system 1302 may include a processor 1306, which may communicate with a computer-readable storage medium 1306 to load computer-readable instructions and data therefrom for execution. The computer-readable storage medium 1306 may include the search submission unit 1208, which may include a collection of computer-readable instructions that, when loaded into the processor 1306 and executed, cause the server-based system 1302 to perform the functions described herein.

As described in FIGS. 12 and 13, the search submission unit 1208 may receive one or more input keywords 1206, and formulate the search request 1210 to incorporate the keyword 1206. The input keyword 1206 is matched against the search index file 120, more specifically, against any search terms exposed by the search index file. FIG. 12 shows two examples of such search terms at 1008 and 1006x. If the input keyword matches a search term (e.g., 1008) extracted from a first document (e.g., 302), and if the matched search term is merged with a search term (e.g., 1006x) extracted from another document (e.g., 310x), then the search may obtain both documents via a link between these synonym two merged documents (e.g., 1012). In this manner, the operating environment 1300 may return search results 1212 that include both documents 302 and 310x, as indicated in FIG. 13. In this manner, the operating environment 1300 capitalizes on the preprocessing described in FIGS. 1-11, which preprocessing merges synonyms to facilitate more efficient searching at search-time.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A computer-implemented method comprising:
under control of one or more computer systems configured with executable instructions,
receiving, via a network, a threshold parameter indicating a predetermined threshold similarity of subject matter;
receiving, via the network, at least one input document associated with an item available for purchase, the at least one input document to be indexed into a search index file, wherein the at least one input document includes at least two fields, the at least two fields having content, and the predetermined threshold similarity of subject matter exists at least when a percentage of fields in a structure of the at least one input document correspond to fields in a structure of at least one existing document;
comparing a subject matter of the at least one input document to a subject matter of the at least one existing document, wherein the at least one existing document relates to another item available for purchase and is already indexed into the search index file;
determining, based at least on the comparison, that the at least one input document and the at least one existing document meet the predetermined threshold similarity of subject matter;
responsive to determining that the at least one input document and the at least one existing document meet the predetermined threshold similarity of subject matter, comparing words in the at least one input document with words in the at least one existing document;

designating any dissimilar words or phrases between the at least one input document and the at least one existing document as candidate synonyms;

merging the candidate synonyms into the search index file, wherein the merging associates the dissimilar words or phrases as synonyms in the search index file; and indexing the at least one input document into the search index file.

2. The method of claim 1, wherein receiving at least one input document includes receiving a document that is to be accessible from a network resource.

3. The method of claim 1, wherein receiving at least one input document includes receiving a document that corresponds to items that are accessible from a network resource.

4. The method of claim 3, wherein the at least one input document is associated with items that are accessible in a first category on the network resource, and wherein the at least one existing document is associated with items that are accessible in a further category on the network resource.

5. The method of claim 3, wherein the at least one input document and the at least one existing document are associated with respective items that are accessible in the same category on the network resource.

6. The method of claim 1, wherein comparing the subject matter of the at least one input document to the subject matter of the at least one existing document includes comparing at least one field of the input document to at least one field of the existing document.

7. The method of claim 1, wherein comparing the subject matter of the at least one input document to the subject matter of the at least one existing document includes comparing words or phrases of the content of the at least one field of the at least one input document to words or phrases of the content of the at least one field of the at least one existing document.

8. The method of claim 1, wherein determining that the input at least one document and the at least one existing document meet the threshold similarity of subject matter includes determining that the at least one input document and the at least one existing document contain at least one similar field.

9. The method of claim 1, wherein determining that the at least one input document and the at least one existing document meet the threshold similarity of subject matter includes determining that the at least one input document and the at least one existing document contain at least one similar field that contains similar words or phrases.

10. The method of claim 1, wherein comparing the subject matter of the at least one input document to the subject matter of the at least one existing document comprises identifying at least one similar aspect common between the at least one input document and the at least one existing document, and identifying at least one dissimilar aspect between the at least one input document and the at least one existing document.

11. The method of claim 1, wherein comparing the subject matter of the at least one input document to the subject matter of the at least one existing document comprises identifying at least one dissimilar field that appears in the at least one input document and does not appear in the at least one existing document.

12. The method of claim 1, wherein comparing the subject matter of the at least one input document to the subject matter of the at least one existing document comprises identifying at least one similar field that appears in the at least one input document and in the at least one existing document, and further comprising identifying dissimilar words or phrases of the field that appear in the at least one input document and do not appear in the at least one existing document.

13. The method of claim 1, wherein comparing the subject matter of the at least one input document to the subject matter of the at least one existing document comprises identifying at least one similar field that appears in the at least one input document and in the at least one existing document, identifying similar words or phrases of the field that appear in the at least one input document and the at least one existing document, and identifying dissimilar words or phrases of the field that appear in the at least one input document and do not appear in the at least one existing document.

14. One or more computer-readable storage media for storing instructions that, when loaded into a processor and executed, perform the method of claim 1.

15. The method of claim 1, wherein the received threshold parameter is tailored in accordance with one or more of the fields of the at least one input document and/or the content of the one or more of the fields of the at least one input document.

16. The method of claim 1, wherein the threshold parameter is received according to at least one field of the at least two fields of the input document and/or content of the at least one field of the at least two fields of the at least one input document.

17. The method of claim 16, wherein the threshold parameter includes a percentage of corresponding content of the at least one field of the at least two fields of the at least one input document.

18. The method of claim 1, wherein the predetermined threshold similarity of subject matter exists including when some but not all of the fields of the at least one input document correspond to fields of the at least one existing document.

19. The method of claim 1, wherein the predetermined threshold similarity of subject matter exists including when some but not all of the fields of the at least one existing document correspond to fields of the at least one input document.

20. The method of claim 1, wherein the predetermined threshold similarity of subject matter exists including when the fields of the at least one input document that correspond to fields of the at least one existing document includes some but not all of the fields of both the at least one input document and the at least one existing document.

21. The method of claim 1, wherein the predetermined threshold similarity of subject matter exists including when the percentage of fields of the at least one input document that correspond to fields of the at least one existing document is greater than 0% and less than 100%.

22. A system comprising:
a memory and a processor;
a search index construction unit stored in the memory and executable by the processor, for receiving, via a network, data relating to at least one input document associated with a new item available for purchase, and for generating search index information for the at least one input document, the data received including a threshold parameter indicating a predetermined threshold similarity of subject matter, wherein a structure of the at least one input document includes at least two fields, the at least two fields each containing content, and the predetermined threshold similarity of subject matter exists at least when a percentage of fields in the structure of the at least one input document correspond to fields in a structure of at least one existing document; and
a synonym recognition unit stored in the memory and executable by the processor, in communication with the search index construction unit for:

receiving the data relating to the at least one input document, comparing a subject matter of the data relating to the at least one input document to a subject matter of at least further data received from the at least one existing document that relates to an item available for purchase, determining, based at least on the comparison, that the at least one input document and the at least one existing document meet the predetermined threshold similarity of subject matter;

responsive to determining that the at least one input document and the at least one existing document meet the predetermined threshold similarity of subject matter, comparing words in the at least one input document to words in the at least one existing document; and designating any dissimilar words or phrases between the at least one input document and the at least one existing document as candidate synonyms; and the search index construction unit being further configured to:

merge the candidate synonyms into a search index file, wherein the merging associates the dissimilar words or phrases as synonyms in the search index file, and index the at least one input document into the search index file.

23. The system of claim 22, wherein the search index construction unit is for receiving data relating to an input document that represents items available through a merchant network resource.

24. The system of claim 22, wherein the search index construction unit is for receiving data relating to an input document that is accessible through a network resource.

25. The system of claim 22, wherein comparing the subject matter of the data relating to the at least one input document to the subject matter of at least further data received from the at least one existing document includes comparing fields from the at least one input document to further fields from the at least one existing document to determine a degree of relationship between the at least one input document and the at least one existing document.

26. The system of claim 22, wherein comparing the subject matter of the data relating to the at least one input document to the subject matter of at least further data received from the at least one existing document includes comparing words or phrases of fields from the at least one input document to words or phrases of further fields from the at least one existing document to determine a degree of relationship between the at least one input document and the at least one existing document.

27. The system of claim 25, wherein the synonym recognition unit is for determining that the degree of relationship indicates that the at least one input document is unlikely to contain synonyms of words or phrases that occur in the at least one existing document.

28. The system of claim 25, wherein the synonym recognition unit is for eliminating the at least one existing document from further analysis to detect synonyms with the at least one input document.

29. The system of claim 25, wherein the synonym recognition unit is for determining that the degree of relationship indicates that the at least one input document is likely to contain synonyms of words or phrases that occur in the at least one existing document.

30. The system of claim 25, wherein the synonym recognition unit is for selecting the at least one existing document for further analysis to detect synonyms with the at least one input document.

31. The system of claim 30, wherein the synonym recognition unit is for performing at least a further thresholding operation to determine a level of similarity between the at least one input document and the at least one existing document.

32. The system of claim 30, wherein the synonym recognition unit is for identifying similar fields between the at least one input document and the at least one existing document, and for identifying dissimilar fields between the at least one input document and the at least one existing document.

33. The system of claim 32, wherein the synonym recognition unit is for considering how many fields between the at least one input document and the at least one existing document are similar and how many fields are dissimilar in determining whether the at least one input document contains any synonyms with terms that occur in the at least one existing document.

34. The system of claim 33, wherein the synonym recognition unit is for outputting the dissimilar fields as candidate synonyms.

35. The system of claim 30, wherein the synonym recognition unit is for identifying similar words or phrases within at least one field that occurs within the at least one input document and the at least one existing document, and for identifying dissimilar words or phrases within the at least one field.

36. The system of claim 35, wherein the synonym recognition unit is for considering how many words or phrases within the fields are similar and how many words or phrases within the fields are dissimilar in determining whether the at least one input document contains any synonyms with terms that occur in the at least one existing document.

37. The system of claim 36, wherein the synonym recognition unit is for outputting the dissimilar words or phrases within the fields as candidate synonyms.

38. The system of claim 36, wherein the synonym recognition unit is for outputting the dissimilar words or phrases within the fields as candidate synonyms, in the context of the similar words or phrases within the fields.

39. The system of claim 22, wherein the synonym recognition unit is for identifying at least one dissimilar field that appears in the at least one input document and does not appear in the at least one existing document.

40. The system of claim 22, wherein the synonym recognition unit is for identifying at least one similar field that appears in the at least one input document and in the at least one existing document, and further comprising identifying dissimilar words or phrases of the at least one field that appear in the at least one input document and do not appear in the at least one existing document.

41. The system of claim 22, wherein the synonym recognition unit is for identifying at least one similar field that appears in the at least one input document and in the at least one existing document, identifying similar words or phrases of the at least one similar field that appear in the at least one input document and the at least one existing document, and identifying dissimilar words or phrases of the at least one similar field that appear in the at least one input document and do not appear in the at least one existing document.

42. One or more computer-readable storage media encoded with instructions that, when executed, cause a processor to perform acts comprising:

receiving, via a network connection, a threshold parameter indicating a predetermined threshold similarity of subject matter and an input document associated with a new item available for purchase, the input document to be indexed into a search index file;

comparing a subject matter of the input document to a subject matter of an existing document that relates to an item available for purchase and is already indexed into the search index file, wherein the structure of the input document includes at least two fields, the at least two fields each including content, and the predetermined threshold similarity of subject matter exists at least when a percentage of fields in a structure of the input document correspond to fields in a structure of the existing document;

determining, based at least on the comparison, that the input document and the existing document meet the predetermined threshold similarity of subject matter;

responsive to determining that the input document and the existing document meet the predetermined threshold similarity of subject matter, identifying text in the input document that is dissimilar to text in the existing document;

designating any dissimilar text between the input document and the existing document as candidate synonyms;

merging the candidate synonyms into the search index file, wherein the merging associates the dissimilar text as synonyms in the search index file; and indexing the input document into the search index file.

43. The one or more computer-readable storage media of claim 42, wherein the comparing includes comparing at least one field of the input document to at least one field of the existing document.

44. The one or more computer-readable storage media of claim 42, wherein the comparing includes comparing text of the input document to text of the existing document.

45. The one or more computer-readable storage media of claim 42, wherein determining that the input document and the existing document meet the predetermined threshold similarity of subject matter includes determining that the input document and the existing document contain at least one similar field.

46. The one or more computer-readable storage media of claim 42, wherein determining that the input document and the existing document meet the predetermined threshold similarity of subject matter includes determining that the input document and the existing document contain at least one similar field that contains similar text.

47. The one or more computer-readable storage media of claim 42, wherein identifying text comprises identifying words or phrases.

* * * * *